(12) United States Patent  
Braham et al.

(10) Patent No.: US 8,935,264 B2  
(45) Date of Patent: Jan. 13, 2015

(54) CHARACTERISTIC-BASED SELECTION IN A NETWORKED COMPUTING ENVIRONMENT

(75) Inventors: Adam D. Braham, Rochester, MN (US); Jeffrey A. Schmidt, Rochester, MN (US); Lowell C. Thomason, Kasson, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/470,389

(22) Filed: May 14, 2012

(65) Prior Publication Data

US 2013/0304747 A1 Nov. 14, 2013

(51) Int. Cl.
*G06Q 30/06* (2012.01)
*G06F 17/30* (2006.01)

(52) U.S. Cl.
CPC ........ *G06Q 30/0631* (2013.01); *G06F 17/3053* (2013.01)
USPC .......................................... 707/749; 705/26.7

(58) Field of Classification Search
CPC .................... G06F 17/3053; G06Q 30/0631
USPC .................................................. 707/769, 749
See application file for complete search history.

(56) References Cited

U.S. PATENT DOCUMENTS

| | | |
|---|---|---|
| 6,572,377 B2 | 6/2003 | Masters |
| 7,194,428 B2 | 3/2007 | Wan et al. |
| 7,398,231 B2 | 7/2008 | Wan et al. |
| 7,437,344 B2 | 10/2008 | Peyrelevade |
| 7,441,706 B1 * | 10/2008 | Schuessler et al. ...... 235/462.15 |
| 7,537,158 B1 | 5/2009 | Cox et al. |
| 7,860,862 B2 | 12/2010 | Slaney et al. |
| 7,928,991 B2 | 4/2011 | Moran et al. |
| 2002/0045959 A1 * | 4/2002 | Van Overveld ................. 700/90 |
| 2006/0020486 A1 * | 1/2006 | Kurzweil et al. ................. 705/1 |
| 2006/0169783 A1 * | 8/2006 | Gagne .......................... 235/487 |
| 2007/0076013 A1 | 4/2007 | Campbell et al. |

(Continued)

FOREIGN PATENT DOCUMENTS

EP 1118846 A2 7/2001
WO 2011085727 A1 7/2011

OTHER PUBLICATIONS

Maitland, J., "Keeping Control Isn't Easy", Chapter 4: Cloud-Based Infrastructure, SearchCloudComputing.com, 13 pages.
Mell, P. et al., "The NIST Definition of Cloud Computing", National Institute of Standards and Technology, Information Technology Laboratory, Version 15, Oct. 7, 2009, 2 pages.

(Continued)

*Primary Examiner* — William Spieler
(74) *Attorney, Agent, or Firm* — William E. Schiesser; Hunter E. Webb; Keohane & D'Alessandro PLLC (57) ABSTRACT

Embodiments of the present invention relate to an approach for characteristic-based (e.g., color) selection of items (e.g., clothing) in a networked computing environment (e.g., a cloud computing environment). Specifically, at least one computer storage device will be populated with a first set of items. The first set of items may be associated in the at least one computer storage device with a first set of corresponding characteristics. A computer data structure may then be generated that comprises compatibility scores of the first set of items to one another. A second set of items may then be received in the at least one computer storage device. The second set of items may also be accompanied by a second set of corresponding characteristics. A set of matches between the first set of items and the second set of items may then be generated according to one or more criteria.

22 Claims, 8 Drawing Sheets

(56) References Cited

U.S. PATENT DOCUMENTS

| | | | |
|---|---|---|---|
| 2007/0225859 A1* | 9/2007 | Kolesnychenko et al. | 700/216 |
| 2008/0082395 A1* | 4/2008 | Shulman et al. | 705/10 |
| 2008/0281728 A1 | 11/2008 | Gomez | |
| 2009/0281922 A1* | 11/2009 | Childress et al. | 705/27 |
| 2010/0191770 A1* | 7/2010 | Cho et al. | 707/783 |
| 2011/0082764 A1 | 4/2011 | Flusser et al. | |

OTHER PUBLICATIONS

"Stylebook", stylebookapp.com, 3 pages. No authors cited. Publication date not cited.

"Visionmax and Verizon Wireless Show Futuristic Retail Solutions at 2012 CES", www.visionmax.com, 2012, 13 pages. No authors cited.

"i-Style", www.theistyle.com, 2010, 4 pages. No authors cited.

* cited by examiner

| ITEM | COLOR | ITEM | COLOR | COMPATIBILITY % |
|---|---|---|---|---|
| TIE | BLUE | SHIRT | YELLOW | 85% |
| BELT | BROWN | PANTS | BLUE | 95% |
| SHIRT | GREEN | HAT | OLIVE | 35% |
| COUCH | TAN | PAINT | RED | 65% |

CHARACTERISTIC-BASED SELECTION IN A NETWORKED COMPUTING ENVIRONMENT

TECHNICAL FIELD

In general, embodiments of the present invention pertain to item selection. Specifically, embodiments of the present invention relate to characteristic-based item selection in a networked computing environment.

BACKGROUND OF THE INVENTION

Individuals with physical limitations (e.g., color blindness) may be faced with various challenges in everyday life. For example, individuals with color blindness may have difficulty coordinating items such as clothing. At present, approaches for addressing visual impairments typically include various optical filtering devices. Unfortunately, such devices may be both costly and subject to loss, etc. As such, challenges may exist in providing a cost effective and reliable option for those limitations.

SUMMARY

In general, embodiments of the present invention relate to an approach for characteristic-based (e.g., color) selection of items (e.g., clothing) in a networked computing environment (e.g., a cloud computing environment). Specifically, at least one computer storage device will be populated with a first set of items (e.g., clothing associated with a user). The first set of items may be associated in the at least one computer storage device with a first set of corresponding characteristics (e.g., colors, patterns, styles, sizes, etc.). A computer data structure (e.g., a table) may then be generated includes scores that indicate the compatibility of the first set of items to one another. A second set of items (e.g., additional clothing items from a retailer) may then be received in the at least one computer storage device. The second set of items may also be accompanied by a second set of corresponding characteristics (e.g., colors, patterns, styles, sizes, etc.). A set of matches between the first set of items and the second set of items may then be generated according to one or more criteria.

A first aspect of the present invention provides a computer-implemented method for characteristic-based item selection in a networked computing environment, comprising: populating at least one computer storage device with a first set of items, the first set of items being associated in the at least one computer storage device with a first set of corresponding characteristics; generating a computer data structure of the first set of items having corresponding compatibility scores of the first set of items to one another; receiving, in the at least one computer storage device, a second set of items that correspond to the first set of items, the second set of items being accompanied by a second set of corresponding characteristics; and generating a set of matches between the first set of items and the second set of items.

A second aspect of the present invention provides computer-implemented method for characteristic-based item selection in a networked computing environment, comprising: a memory medium comprising instructions; a bus coupled to the memory medium; and a processor coupled to the bus that when executing the instructions causes the system to: populate at least one computer storage device with a first set of items, the first set of items being associated in the at least one computer storage device with a first set of corresponding characteristics; generate a computer data structure of the first set of items having corresponding compatibility scores of the first set of items to one another; receive, in the at least one computer storage device, a second set of items that correspond to the first set of items, the second set of items being accompanied by a second set of corresponding characteristics; and generate a set of matches between the first set of items and the second set of items.

A third aspect of the present invention provides a computer program product for characteristic-based item selection in a networked computing environment, the computer program product comprising a computer readable storage media, and program instructions stored on the computer readable storage media, to: populate at least one computer storage device with a first set of items, the first set of items being associated in the at least one computer storage device with a first set of corresponding characteristics; generate a computer data structure of the first set of items having corresponding compatibility scores of the first set of items to one another; receive, in the at least one computer storage device, a second set of items that correspond to the first set of items, the second set of items being accompanied by a second set of corresponding characteristics; and generate a set of matches between the first set of items and the second set of items.

A fourth aspect of the present invention provides a method for deploying a system for characteristic-based item selection in a networked computing environment, comprising: providing a computer infrastructure being operable to: populate at least one computer storage device with a first set of items, the first set of items being associated in the at least one computer storage device with a first set of corresponding characteristics; generate a computer data structure of the first set of items having corresponding compatibility scores of the first set of items to one another; receive, in the at least one computer storage device, a second set of items that correspond to the first set of items, the second set of items being accompanied by a second set of corresponding characteristics; and generate a set of matches between the first set of items and the second set of items.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The word "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof. The terms "computer data structure" or "data structure" are intended to mean any type of structure capable of containing data such as a table, a list, a graph, etc.

In general, embodiments of the present invention relate to an approach for characteristic-based (e.g., color) selection of items (e.g., clothing) in a networked computing environment (e.g., a cloud computing environment). Specifically, at least one computer storage device will be populated with a first set of items (e.g., clothing associated with a user). The first set of items may be associated in the at least one computer storage device with a first set of corresponding characteristics (e.g., colors, patterns, styles, sizes, etc.). A computer data structure may then be generated that comprises compatibility scores of the first set of items to one another. A second set of items (e.g., additional clothing items from a retailer) may then be received in the at least one computer storage device. The second set of items may also be accompanied by a second set of corresponding characteristics (e.g., colors, patterns, styles, sizes, etc.). A set of matches between the first set of items and the second set of items may then be generated according to one or more criteria.

Figure 1:
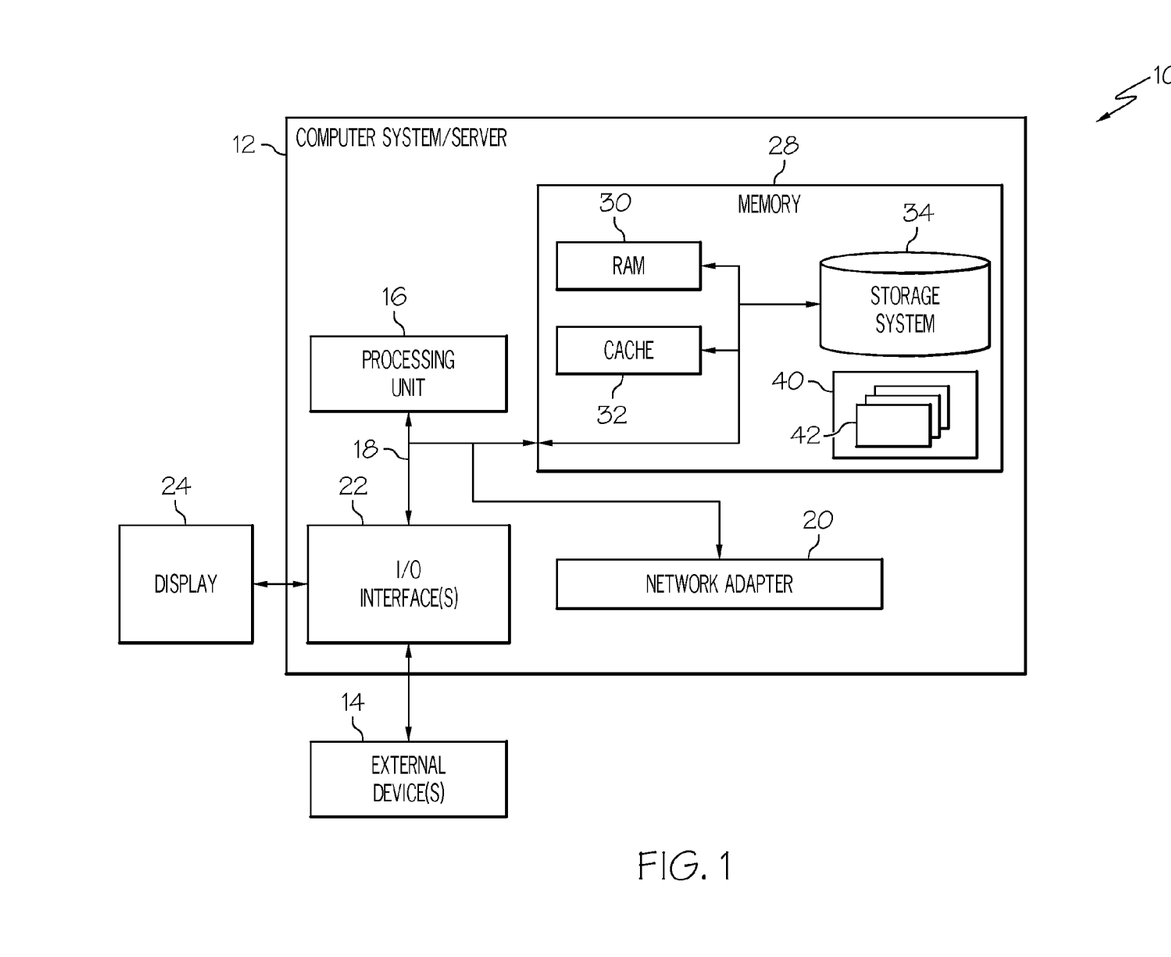
FIG. 1 depicts a computing node according to an embodiment of the present invention.

Referring now to FIG. 1, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, mobile devices, global positioning systems (GPS), GPS-enable devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on, which perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Characteristic-based item selection program/utility 40, having a set (at least one) of program modules 42, may be stored in memory 28 by way of example, and not limitation, as well as an operating system, one or more application programs, other program modules, and program data. In general, characteristic-based item selection 40 performs the function of the present invention as described herein. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
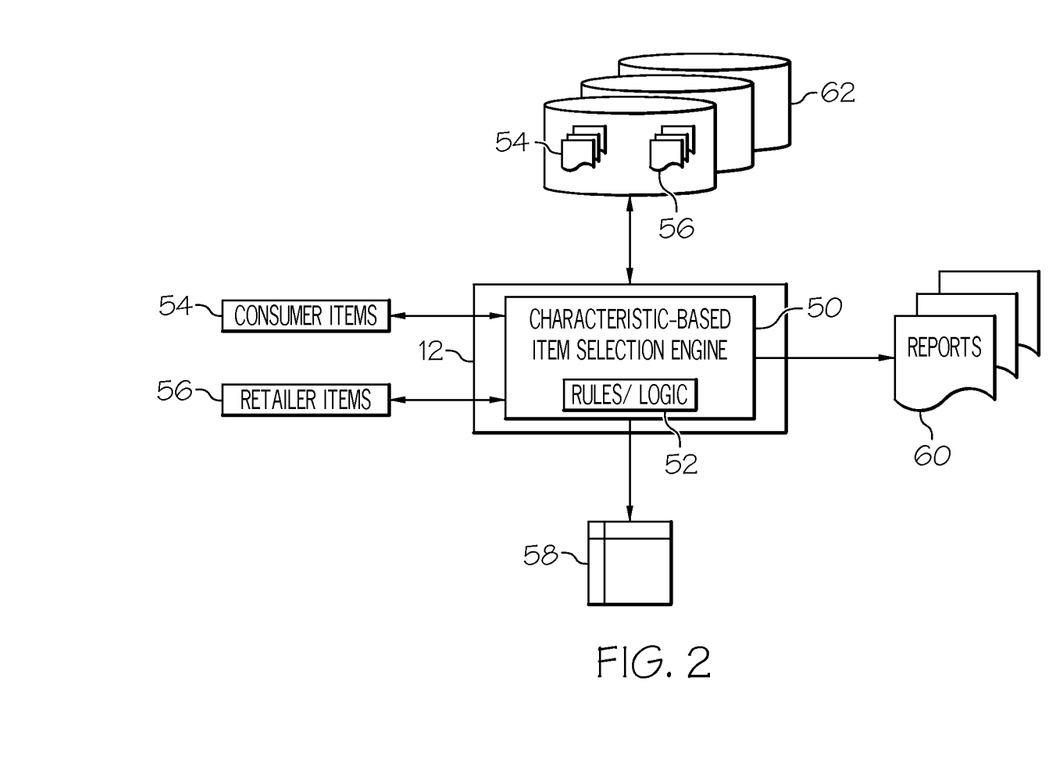
FIG. 2 depicts a system diagram according to an embodiment of the present invention.

Referring now to FIG. 2, a system diagram describing the functionality discussed herein according to an embodiment of the present invention is shown. It is understood that the teachings recited herein may be practiced within any type of networked computing environment (e.g., a cloud computing environment). A computer system/server 12, which can be implemented as either a stand-alone computer system, or as a networked computer system is shown in FIG. 2. In the event the teachings recited herein are practiced in a networked computing environment, each client need not have a characteristic-based item selection engine (engine 50). Rather, engine 50 could be loaded on a server (e.g., payment processing server) or server-capable device that communicates (e.g., wirelessly) with the clients to provide characteristic-based item selection functionality hereunder. In addition, to the extent data is communicated hereunder over one or more networks, said network may comprise any type of network now known or later developed (e.g., a cloud computing network). Regardless, as depicted, engine 50 is shown within computer system/server 12. In general, engine 50 can be implemented as program/utility 40 on computer system 12 of FIG. 1 and can enable the functions recited herein. As further shown, engine 50 (in one embodiment) comprises a rules and/or computational engine that processes a set (at least one) of rules/logic 52 and/or provides characteristic-based item selection functionality hereunder. It is understood that although a typical embodiment describes application to garments and/or clothing. The teachings hereunder may be applied to any item and/or characteristics (e.g., furniture, computer components, etc).

Along these lines, engine 50 may perform multiple functions similar to a general-purpose computer. Specifically, among other functions, engine 50 may (among other things): populate at least one computer storage device 62 with a first set (e.g., one or more) of items 54 (e.g., based on one or more images received from a user), the first set of items 54 (e.g., clothing) being associated in the at least one computer storage device 62 with a first set of corresponding characteristics (e.g., colors, patterns, styles, sizes, etc.); generate a computer data structure (e.g., a table 58) of the first set of items having corresponding compatibility scores of the first set of items to one another; receive, in the at least one computer storage device 62, a second set of items 56 (e.g., from a retailer) that correspond to the first set of items 54, the second set of items 56 (e.g., clothing) being accompanied by a second set of corresponding characteristics (e.g., colors, patterns, styles, sizes, etc.); generate a set of matches between the first set of items and the second set of items (e.g., based on a best match of the first set of corresponding characteristics to the second set of corresponding characteristics); and/or provide output 60 (e.g., reports) pertaining to the set of matches.

Figure 3:
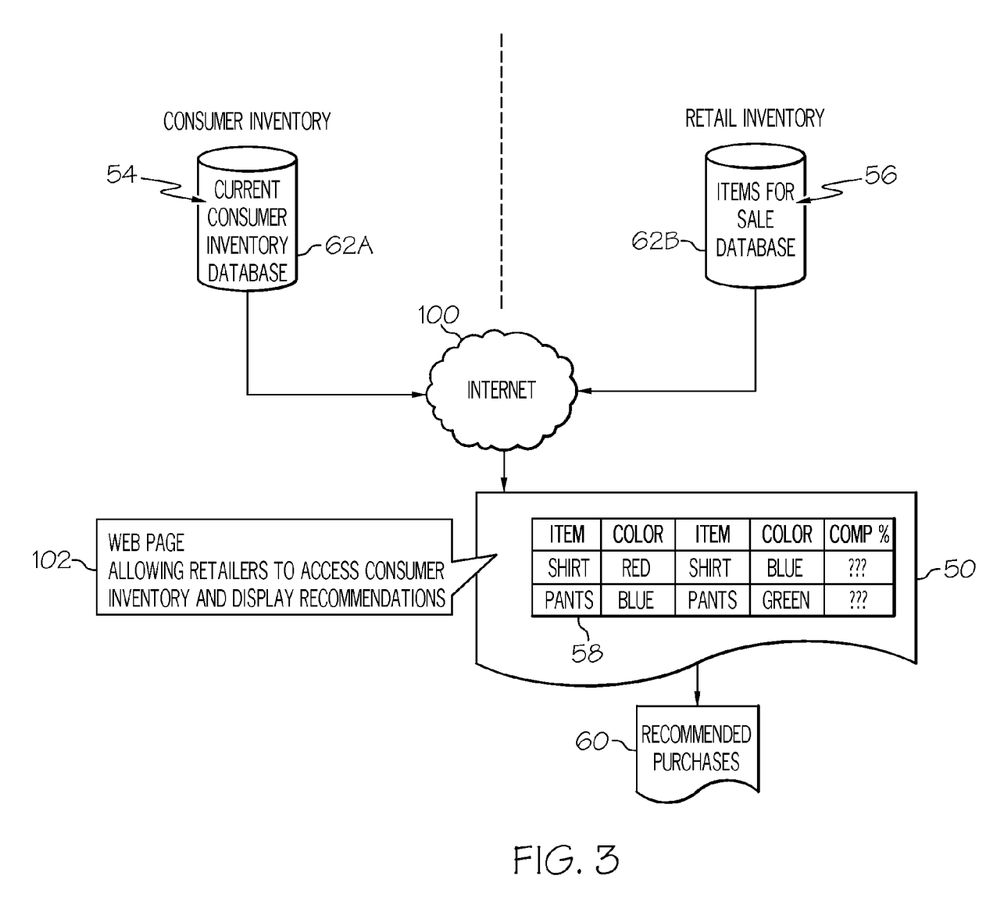
FIG. 3 depicts a process flow diagram according to an embodiment of the present invention.
Figure 4:
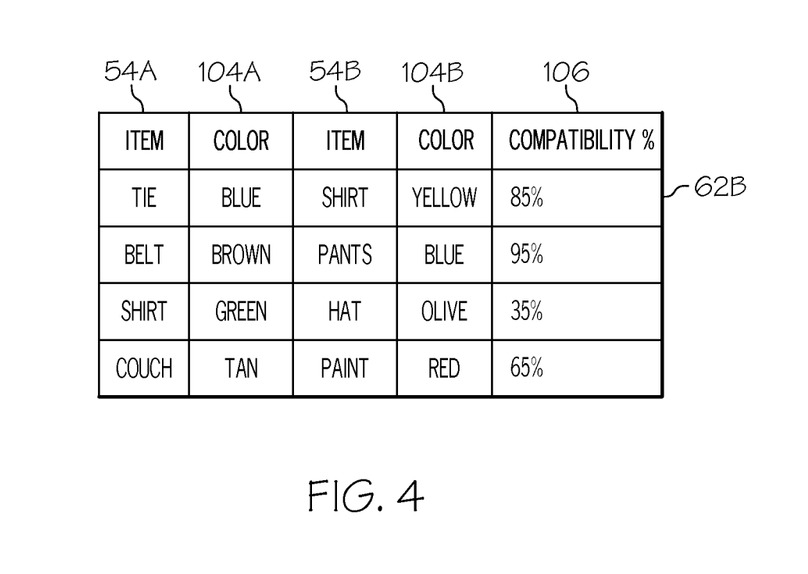
FIG. 4 depicts an illustrative table according to an embodiment of the present invention.

A more detailed depiction of a clothing-based implementation is shown in FIG. 3. As depicted in FIG. 3, a consumer inventor database 62A may be populated with items associated with a consumer/user via engine 50 over a network 100 (e.g., the Internet). Such items may be populated by uploading photos thereof via engine and/or web page 102. Engine 50 may be configured to identify the items as well as corresponding characteristics from the photos. Alternatively, a user may manually enter such data. Based on database 62, engine 50 will create a table 58 that associates the items 54 (e.g., shirt, pants, etc.) with their corresponding characteristics (e.g., color, size, etc.). Engine 50 may then further generate compatibility scores within table 58 for different combinations of user's items. Such scores may be user-generated, calculated via a template provided from retailers, fashion experts, etc., obtained from social network sites, etc. An illustrative table 58 as populated is shown in FIG. 4. As depicted, table 58 correlates items 54A-B with characteristics 104A-B and compatibility scores 106. In one embodiment, the following algorithm may be applied to determine compatibility between user items:

$$\text{Compatibility \%} = (USER\_RATE\ SOC\_RATE + USER\_RATE)/(USER\_MAX + SOC\_MAX)$$

Where USER_RATE=actual user rating, SOC_RATE=actual social networking website rating(s); USER_MAX=maximum possible user rating; and SOC_MAX=maximum possible social networking website rating. This would allow any defined scale (e.g., a scale of 1 to 5, 1 to 10, etc)ro be accommodated hereunder.

In any event, referring back to FIG. 3, engine 50 will then solicit one or more recommendations for additional items from retailers for the user based on the user's inventory in database 62A and/or table 58. Under such an embodiment, database 62B will be populated with such recommendations/items 56. Engine 50 may then access database 62B and generate a set of matches between user items 54 and retailer items 56. In a typical embodiment, the set of matches represents best matches between items 54 and items 56. Such matches may be determined algorithmically similar to the compatibility percentages discussed above for matching users items 54 to one another. Regardless, output 60 of recommended matches and/or purchased from retailers may be generated and displayed by engine 50.

Figure 5:
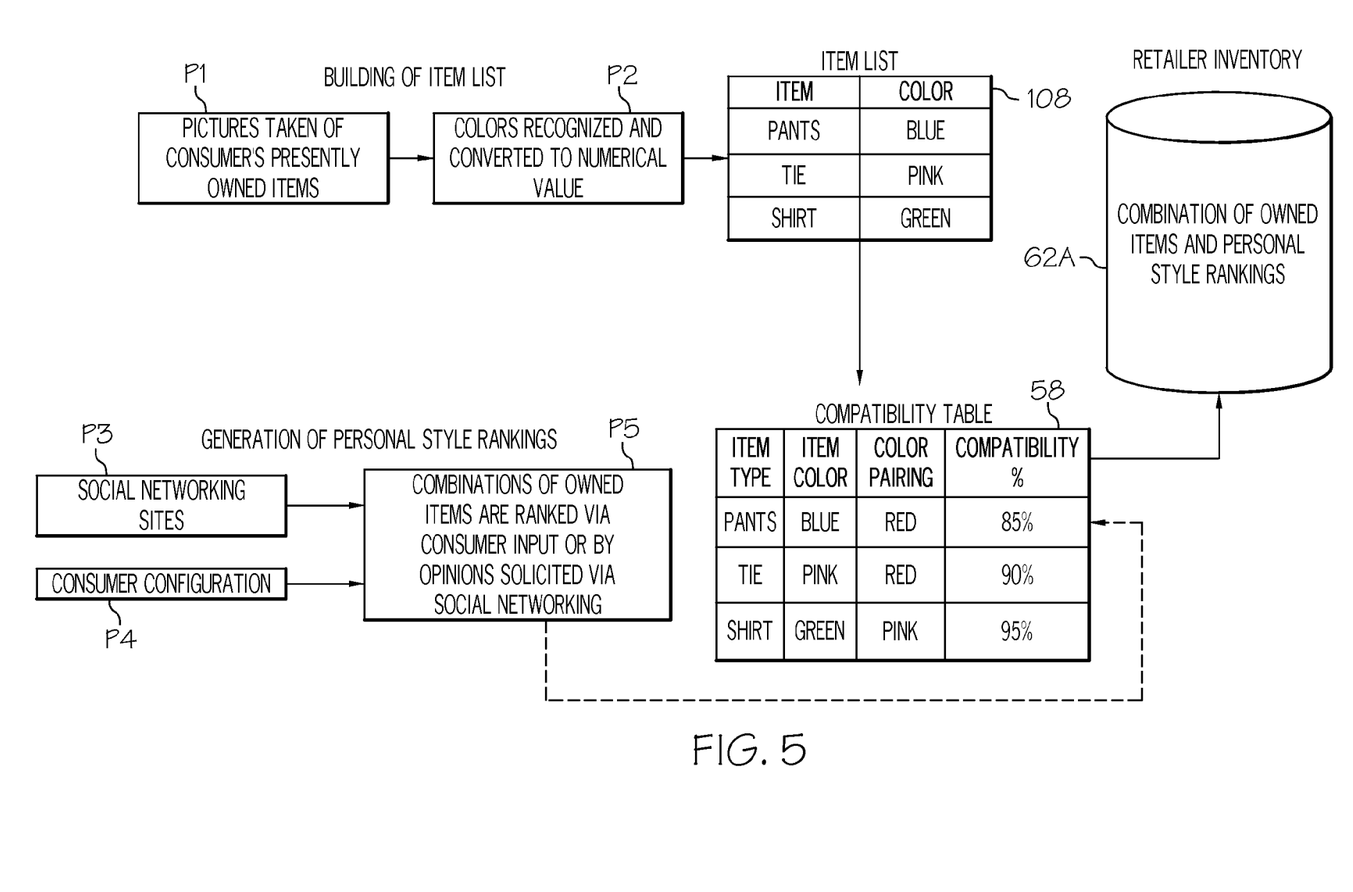
FIG. 5 depicts another process flow diagram according to an embodiment of the present invention.

Referring now to FIG. 5, the process of generating user item table 58 and populating user database 62A is shown in greater detail. As depicted, in step P1, pictures may be taken of items currently owned by a consumer/user. In step P1, colors may be recognized and converted into numerical values (e.g., red=1, blue=2, etc.) and then an item/characteristic list 108 may be generated and used to initially populate table 58. Based on list 108, table 58 may be partially populated. In steps P3-P4, input may be received from social networking sites, user configurations, etc., and used in step P5 to generate compatibility scores to complete table 58, which may then be stored in database 62A.

Figure 6:
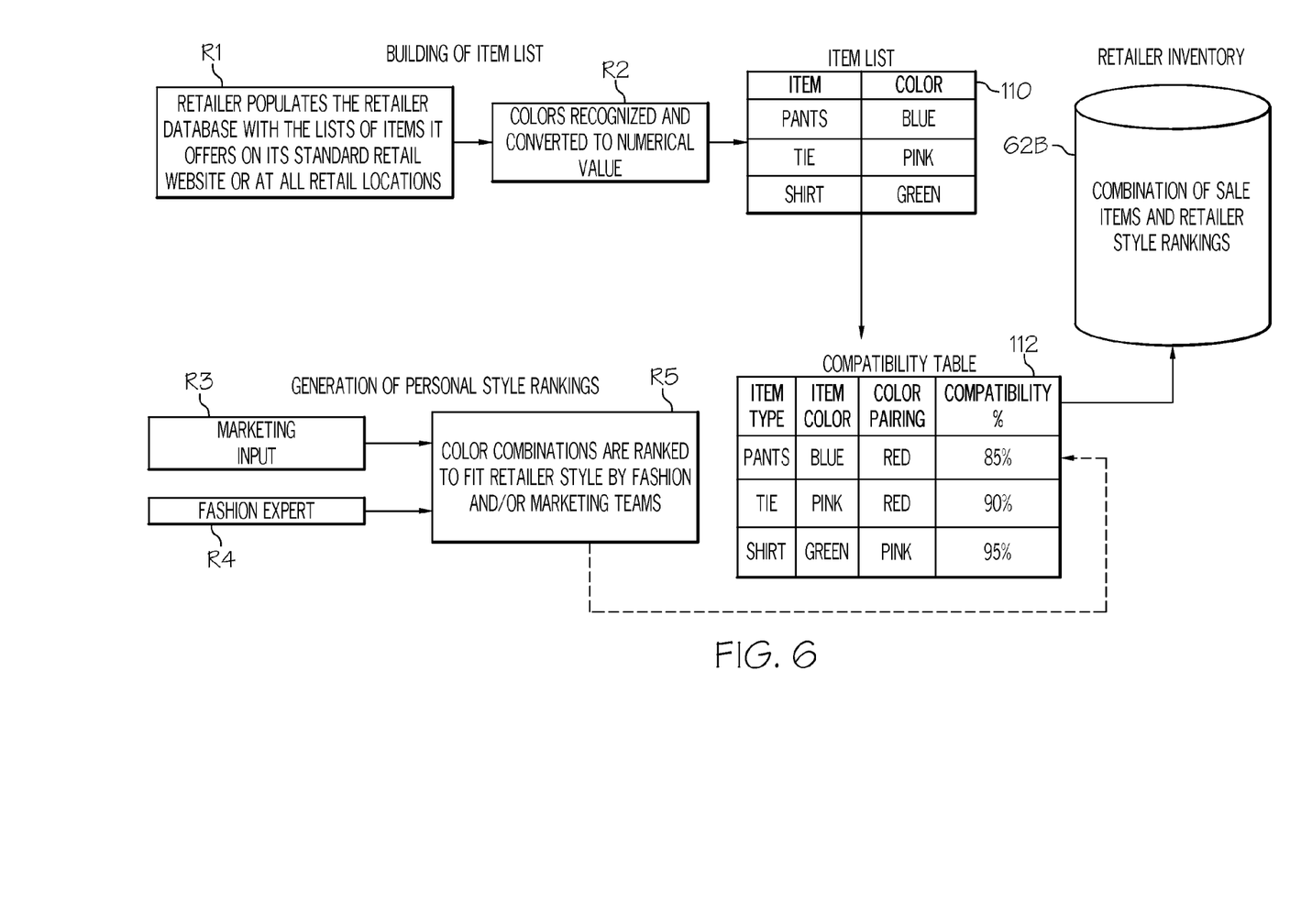
FIG. 6 depicts another process flow diagram according to an embodiment of the present invention.

Referring now to FIG. 6, the process of populating retailer database 62B is shown in greater detail. The process may be similar to that of FIG. 5. Specifically, in step R1, a retailer may store a list of items on its website or at retailer locations. In step R2, the colors, etc., may be recognized and converted into numerical values and populated into a retailer item list 110. Based on retailer item list 110, a retailer table of items 112 may be partially populated. The table may be completed with compatibility scores based on market input and/or fashion expert input in steps R3 and R4, which may then be ranked and converted in step R5 into the compatibility scores. Once table 112 is completed, it may be stored in retailer inventory database 62B.

Figure 7:
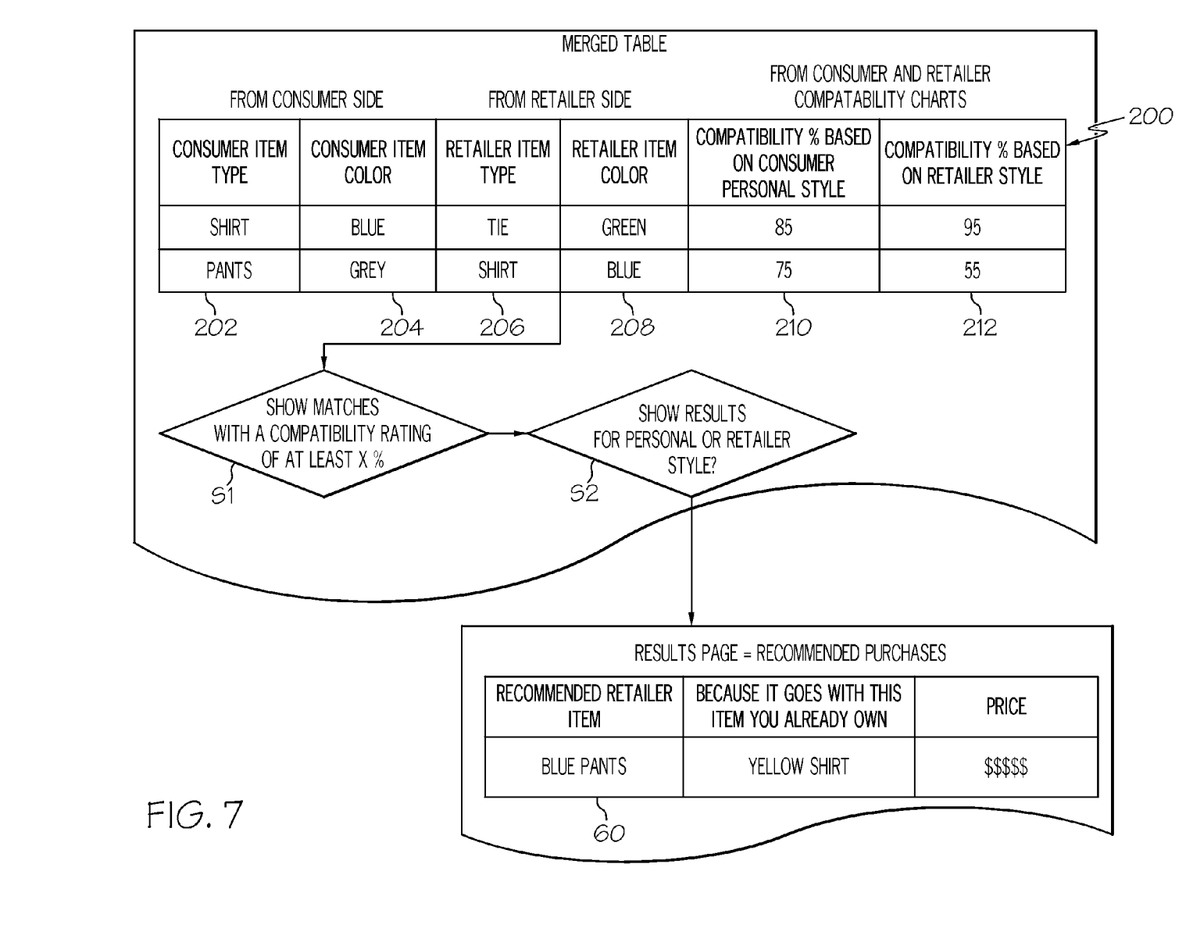
FIG. 7 depicts another process flow diagram according an embodiment of the present invention.

Referring now to FIG. 7, an illustrative output of engine 50 is depicted. As shown, a merged table 200 may be generated by engine 50 of FIG. 2 that comprises user items 202, user item characteristics 204, retailer items 206, retailer item characteristics 208, compatibility percentages based on the user's personal style 210, and compatibility percentages based on the retailer's style 212. This table may be processed by the engine in steps S1 to show best matches with a rating above a predetermined threshold. The results may be further refined to reflect the user's or the retailer's style in step S2. In any event, a report 60 or the like showing the best matches and/or recommendations may be provided by the engine. This could be determined by utilize a previously generated match/compatibility table utilizing the numerical scores assigned to user items and/or retailer items.

Figure 8:
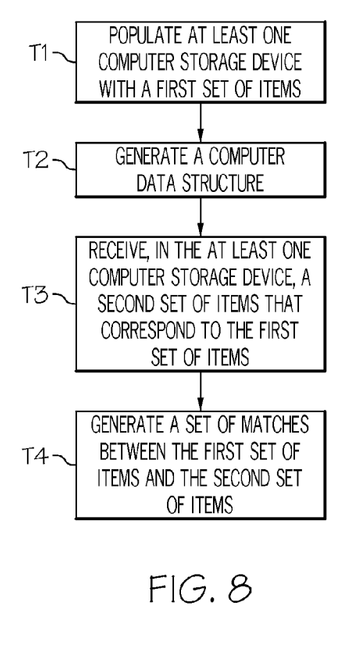
FIG. 8 depicts a method flow diagram, according to an embodiment of the present invention.

Referring now to FIG. 8, a method flow diagram according to an embodiment of the present invention is shown (e.g., as enabled by engine 50 of FIG. 2). As depicted, in step T1, at least one computer storage device is populated with a first set of items, the first set of items being associated in the at least one computer storage device with a first set of corresponding characteristics. In step T2, a table is generated of the first set of items having corresponding compatibility scores of the first set of items to one another. In step T3, a second set of items that correspond to the first set of items is received in the at least one computer storage device, the second set of items being accompanied by a second set of corresponding characteristics. In step T4, a set of matches between the first set of items and the second set of items is generated.

While shown and described herein as a characteristic-based item selection solution, it is understood that the invention further provides various alternative embodiments. For example, in one embodiment, the invention provides a computer-readable/useable medium that includes computer program code to enable a computer infrastructure to provide characteristic-based item selection as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide characteristic-based item selection functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for characteristic-based item selection. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for characteristic-based item selection in a networked computing environment, comprising:
    populating at least one computer storage device with a first set of items, the first set of items being a plurality of user items that are associated in the at least one computer storage device with a first set of corresponding characteristics;
    generating, for each item in the first set of items, a compatibility score with respect to each other item in the first set of items, each compatibility score including a numerical representation of a compatibility of a first user item with a second user item;
    generating a first computer data structure of the first set of items having the compatibility scores of the first set of items to one another;
    receiving, in the at least one computer storage device, a second set of items that correspond to the first set of items, the second set of items being a plurality of retailer items that are accompanied by a second set of corresponding characteristics;
    generating, for each item in the second set of items, a compatibility score with respect to each other item in the second set of items, each compatibility score including a numerical representation of a compatibility of a first retailer item with a second retailer item;
    generating a second computer data structure of the second set of items having the compatibility scores of the second set of items to one another;
    merging the first computer data structure with the second computer data structure to yield a merged table; and
    generating a set of matches between the first set of items and the second set of items based on the merged table.

2. The computer-implemented method of claim 1, further comprising receiving a set of images of the first set of items, the populating of the first set of items and the first set of corresponding characteristics being based on the set of images.

3. The computer-implemented method of claim 1, the first set of items being associated with at least one user, and the second set of items being associated with at least one retailer.

4. The computer-implemented method of claim 1, the first set of items and the second set of items comprising clothing, and the first set of corresponding characteristics and the second set of corresponding characteristics comprising colors.

5. The computer-implemented method of claim 4, the set of matches being determined based on a best match of the colors of the first set of items to the second set of items, wherein each compatibility score includes a percentage, which is calculated by dividing a sum of an actual user rating and an actual social networking website rating by a sum of a maximum possible user rating and a maximum possible social networking website rating of the compatibility of the first item with the second item.

6. The computer-implemented method of claim 5, further comprising providing output pertaining to the set of matches.

7. The computer-implemented method of claim 1, the first set of items and the second set of items being provided via at least one computer network.

8. A computer-implemented method for characteristic-based item selection in a networked computing environment, comprising:
    a memory medium comprising instructions;
    a bus coupled to the memory medium; and
    a processor coupled to the bus that when executing the instructions causes the system to:
        populate at least one computer storage device with a first set of items, the first set of items being a plurality of user items that are associated in the at least one computer storage device with a first set of corresponding characteristics;
        generate, for each item in the first set of items, a compatibility score with respect to each other item in the first set of items, each compatibility score including a numerical representation of a compatibility of a first user item with a second user item;
        generate a first computer data structure of the first set of items having the compatibility scores of the first set of items to one another;
        receive, in the at least one computer storage device, a second set of items that correspond to the first set of items, the second set of items being plurality of retailer items that are accompanied by a second set of corresponding characteristics;
        generate, for each item in the second set of items, a compatibility score with respect to each other item in the second set of items, each compatibility score including a numerical representation of a compatibility of a first retailer item with a second retailer item;
        generate a second computer data structure of the second set of items having the compatibility scores of the second set of items to one another;
        merge the first computer data structure with the second computer data structure to yield a merged table; and
        generate a set of matches between the first set of items and the second set of items based on the merged table.

9. The system of claim 8, the memory medium further comprising instructions for causing the system to receive a set of images of the first set of items, the populating of the first set of items and the first set of corresponding characteristics being based on the set of images.

10. The system of claim 8, the first set of items being associated with at least one user, and the second set of items being associated with at least one retailer.

11. The system of claim 8, the first set of items and the second set of items comprising clothing, and the first set of corresponding characteristics and the second set of corresponding characteristics comprising colors.

12. The system of claim 11, the set of matches being determined based on a best match of the colors of the first set of items to the second set of items, wherein each compatibility score includes a percentage, which is calculated by dividing a sum of an actual user rating and an actual social networking website rating by a sum of a maximum possible user rating and a maximum possible social networking website rating of the compatibility of the first item with the second item.

13. The system of claim 12, the memory medium further comprising instructions for causing the system to provide output pertaining to the set of matches.

14. The system of claim 8, the first set of items and the second set of items being provided via at least one computer network.

15. A computer program product for characteristic-based item selection in a networked computing environment, the computer program product comprising a computer readable storage media, and program instructions stored on the computer readable storage media, to:
- populate at least one computer storage device with a first set of items, the first set of items being a plurality of user items that are associated in the at least one computer storage device with a first set of corresponding characteristics;
- generate, for each item in the first set of items, a compatibility score with respect to each other item in the first set of items, each compatibility score including a numerical representation of a compatibility of a first user item with a second user item;
- generate a first computer data structure of the first set of items having the compatibility scores of the first set of items to one another;
- receive, in the at least one computer storage device, a second set of items that correspond to the first set of items, the second set of items being plurality of retailer items that are accompanied by a second set of corresponding characteristics;
- generate, for each item in the second set of items, a compatibility score with respect to each other item in the second set of items, each compatibility score including a numerical representation of a compatibility of a first retailer item with a second retailer item;
- generate a second computer data structure of the second set of items having the compatibility scores of the second set of items to one another;
- merge the first computer data structure with the second computer data structure to yield a merged table; and
- generate a set of matches between the first set of items and the second set of items based on the merged table.

16. The computer program product claim 15, the computer readable storage media further comprising instructions to receive a set of images of the first set of items, the populating of the first set of items and the first set of corresponding characteristics being based on the set of images.

17. The computer program product claim 15, the first set of items being associated with at least one user, and the second set of items being associated with at least one retailer.

18. The computer program product claim 15, the first set of items and the second set of items comprising clothing, and the first set of corresponding characteristics and the second set of corresponding characteristics comprising colors.

19. The computer program product claim 18, the set of matches being determined based on a best match of the colors of the first set of items to the second set of items, wherein each compatibility score includes a percentage, which is calculated by dividing a sum of an actual user rating and an actual social networking website rating by a sum of a maximum possible user rating and a maximum possible social networking website rating of the compatibility of the first item with the second item.

20. The computer program product claim 19, the computer readable storage media further comprising instructions to provide output pertaining to the set of matches.

21. The computer program product claim 15, the first set of items and the second set of items being provided via at least one computer network.

22. A method for deploying a system for characteristic-based item selection in a networked computing environment, comprising:
providing a computer infrastructure being operable to:
- populate at least one computer storage device with a first set of items, the first set of items being a plurality of user items that are associated in the at least one computer storage device with a first set of corresponding characteristics;
- generate, for each item in the first set of items, a compatibility score with respect to each other item in the first set of items, each compatibility score including a numerical representation of a compatibility of a first user data item with a second user data item;
- generate a first computer data structure of the first set of items having the compatibility scores of the first set of items to one another;
- receive, in the at least one computer storage device, a second set of items that correspond to the first set of items, the second set of items being a plurality of retailer items that are accompanied by a second set of corresponding characteristics;
- generate, for each item in the second set of items, a compatibility score with respect to each other item in the second set of items, each compatibility score including a numerical representation of a compatibility of a first retailer item with a second retailer item;
- generate a second computer data structure of the second set of items having the compatibility scores of the second set of items to one another;
- merge the first computer data structure with the second computer data structure to yield a merged table; and
- generate a set of matches between the first set of items and the second set of items based on the merged table.

* * * * *